US008838146B2

(12) United States Patent
Yoon

(10) Patent No.: US 8,838,146 B2
(45) Date of Patent: Sep. 16, 2014

(54) MOBILE TERMINAL AND SCHEDULE NOTIFYING METHOD THEREOF

(75) Inventor: Il-Seop Yoon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 690 days.

(21) Appl. No.: 12/761,830

(22) Filed: Apr. 16, 2010

(65) Prior Publication Data

US 2011/0098061 A1 Apr. 28, 2011

(30) Foreign Application Priority Data

Oct. 22, 2009 (KR) .................... 10-2009-0100878

(51) Int. Cl.
| | |
|---|---|
| *H04W 24/00* | (2009.01) |
| *H04W 72/12* | (2009.01) |
| *G06Q 10/06* | (2012.01) |
| *H04L 29/08* | (2006.01) |
| *H04W 64/00* | (2009.01) |
| *H04W 4/02* | (2009.01) |
| *H04L 12/58* | (2006.01) |

(52) U.S. Cl.
CPC .......... *H04W 72/1263* (2013.01); *H04L 67/306* (2013.01); *H04W 64/00* (2013.01); *H04W 4/025* (2013.01); *H04L 67/18* (2013.01); *H04L 12/5895* (2013.01); *G06Q 10/06* (2013.01); *H04W 4/02* (2013.01); *H04W 4/023* (2013.01)
USPC .................. 455/456.3; 455/414.1; 455/418; 455/419; 455/456.1; 455/518; 455/566

(58) Field of Classification Search
CPC ....... H04W 4/02; H04W 64/00; H04W 4/025; H04W 4/023; H04W 4/12; H04L 67/18; H04L 67/306; H04L 12/5895
USPC .......... 455/404.1, 412.1, 412.2, 414.1, 414.2, 455/414.3, 466, 456.1–457, 550.1, 556.2, 455/563, 566, 567, 418, 419, 518; 705/8, 9
See application file for complete search history.

(56) References Cited

U.S. PATENT DOCUMENTS

| | | | | |
|---|---|---|---|---|
| 6,496,116 | B2* | 12/2002 | Farringdon et al. | 340/573.1 |
| 6,920,328 | B2* | 7/2005 | Wollrab | 455/456.1 |
| 7,541,940 | B2* | 6/2009 | Upton | 340/686.1 |
| 7,751,851 | B2* | 7/2010 | Lee et al. | 455/556.1 |
| 7,920,878 | B2* | 4/2011 | Clipsham | 455/457 |
| 7,925,525 | B2* | 4/2011 | Chin | 705/7.19 |
| 7,945,272 | B2* | 5/2011 | Kim | 455/456.2 |
| 2003/0036379 | A1* | 2/2003 | Nikolai et al. | 455/414 |
| 2007/0118415 | A1* | 5/2007 | Chen et al. | 705/8 |
| 2009/0170492 | A1* | 7/2009 | Lee | 455/418 |
| 2010/0293029 | A1* | 11/2010 | Olliphant | 705/9 |
| 2010/0332282 | A1* | 12/2010 | Bradley et al. | 705/9 |

\* cited by examiner

*Primary Examiner* — Olumide T Ajibade Akonai
(74) *Attorney, Agent, or Firm* — Birch, Stewart, Kolasch & Birch, LLP

(57) ABSTRACT

A mobile terminal and a schedule notifying method of the mobile terminal are disclosed. The mobile terminal includes: a wireless communication unit configured to perform radio communication with a location-based service (LBS) providing server; a controller configured to select a participant in a schedule creation mode, discriminately display whether or not the selected participant uses the LBS, registers schedule to a scheduler when creating of the schedule is completed, and acquire location information of the participant using the LBS when an alarm time of the registered schedule arrives; and an output unit configured to output a schedule notification signal and location information of the participant.

18 Claims, 12 Drawing Sheets

(a)  (b)

(a)  (b)

MOBILE TERMINAL AND SCHEDULE NOTIFYING METHOD THEREOF

CROSS REFERENCE TO RELATED APPLICATIONS

The present application claims priority to Korean Application No. 10-2009-0100878 filed in Korea on Oct. 22, 2009, the entire contents of which is hereby incorporated by reference in its entirety.

BACKGROUND OF THE INVENTION

1. Field of the Invention

The present invention relates to a mobile terminal for displaying a location of a friend when a schedule is informed by cooperatively operating a scheduler and a location-based service.

2. Description of the Related Art

As functions of terminals such as personal computers, notebook computers, mobile phones, and the like, become more diversified, the terminals are implemented as multimedia players supporting complicated functions such as capturing images or video, reproducing music or video files, playing games, receiving broadcast signals, and the like. Recently, terminals receive a broadcast or multicast signal to allow users to view video or television programs.

In general, the terminals may be divided into a mobile terminal and stationary terminal according to whether or not terminals are movable. In addition, mobile terminals may be divided into a handheld terminal and a vehicle mount terminal according to whether or not users can directly carry it around.

Efforts are ongoing to support and increase the functionality of mobile terminals. Such efforts include software and hardware improvements, as well as changes and improvements in the structural components which form the terminals.

In general, a mobile terminal registers a new schedule through a scheduler function, and when an alarm time set in the schedule arrives, the mobile terminal outputs a schedule notification signal.

SUMMARY OF THE INVENTION

Accordingly, one object of the present invention is to address the above-noted and other problems.

Another object of the present invention is to provide a mobile terminal for displaying a location of a friend in notifying a schedule by cooperatively operating a scheduler and a location-based service, and its schedule notifying method.

Still another object of the present invention is to provide a mobile terminal for notifying a user about a schedule when friends are within a certain radius based on a location previously set in a schedule in association with a location-based service, and its schedule notifying method.

To achieve these and other advantages and in accordance with the purpose of the present invention, as embodied and broadly described herein, the present invention provides in one aspect a schedule notifying method of a mobile terminal, including: registering a schedule; checking whether or not an alarm time set in the schedule arrives; when the alarm time arrives, checking locations of one or more participants set in the schedule; and displaying the schedule and the locations of the participants.

In another aspect, the present invention provides a mobile terminal including: a wireless communication unit configured to perform radio communication with a server providing a location-based service (LBS); a controller configured to check whether or not the LBS is active when an alarm time of a previously registered schedule arrives, and acquire location information of a participant set in the schedule when the LBS is active; and an output unit configured to output a schedule notification signal and the location information of the participant under the control of the controller.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
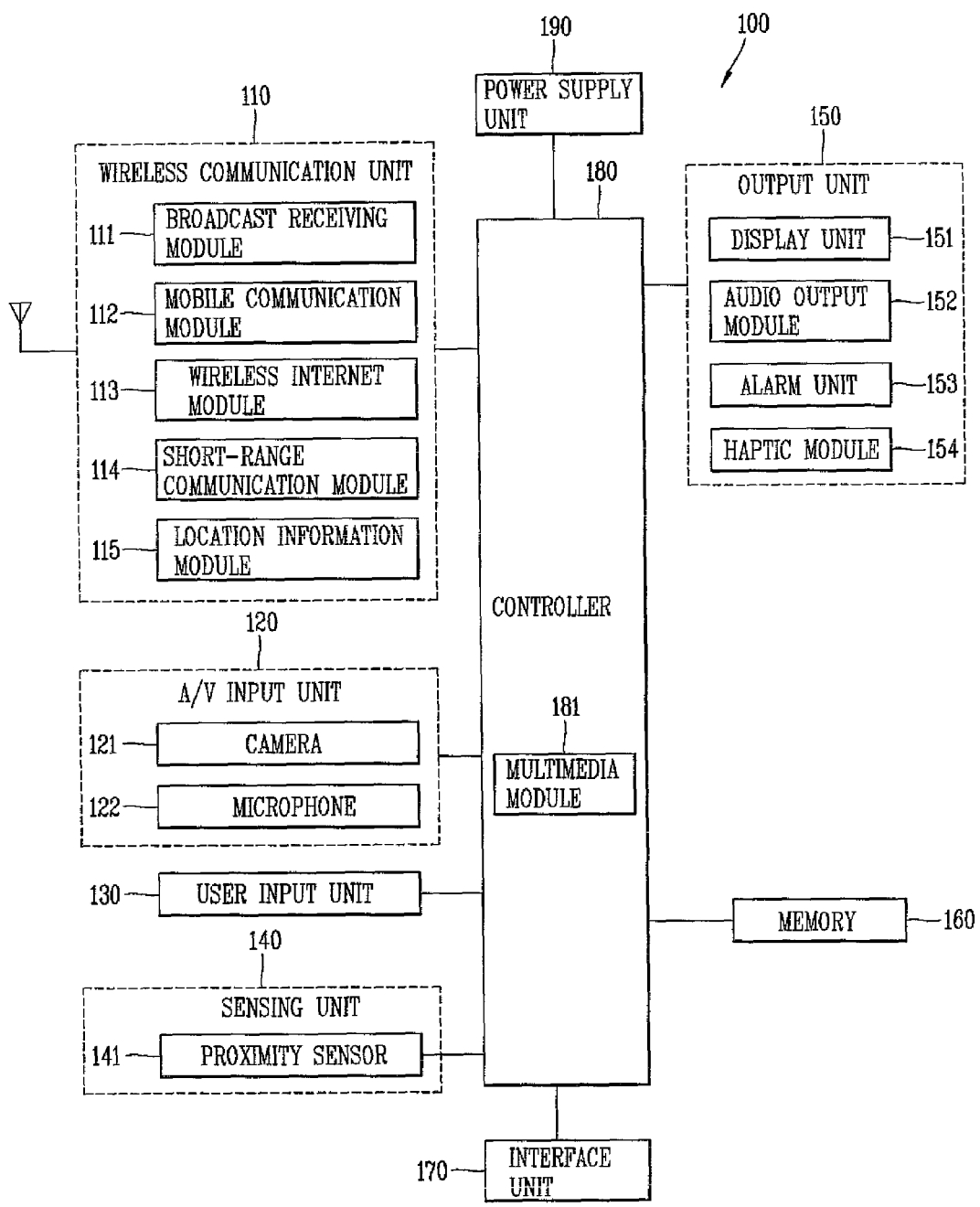
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The controller 180 acquires current location information of the mobile terminal 100 through the location information module 115, and transmits the acquired location information to a server providing a location-based service (LBS) (referred to as 'LBS providing server', hereinafter). The LBS includes GyPSii, Dodgeball, Brightkite, and the like. The LBS providing server stores the location information received from the mobile terminal in a database to keep it.

Also, the controller 180 acquires current location information through the location information module 115 at every certain period and transmits the acquired location information to the LBS providing server. Alternatively, whenever there is a request from the LBS providing server, the controller 180 may acquire location information through the location information module 115 and transmits it to the LBS server.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
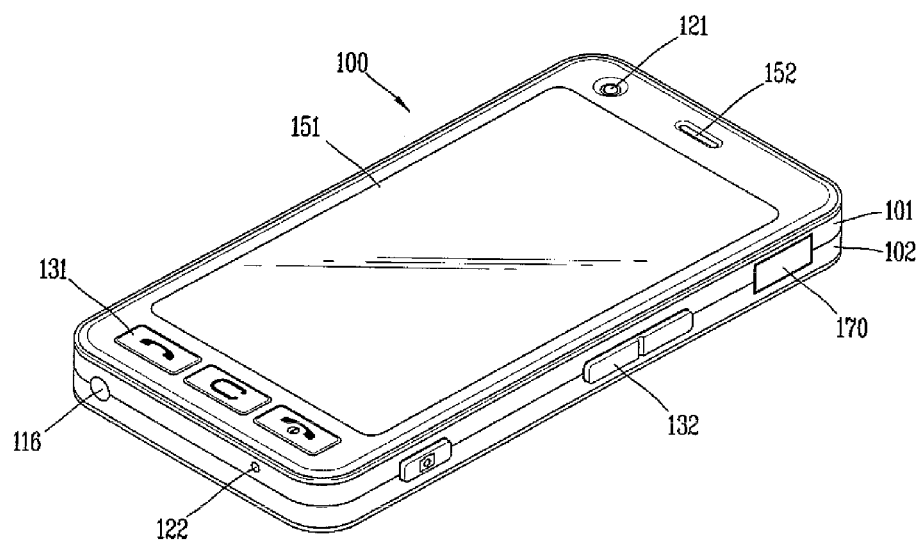
FIG. 2a is a front perspective view of a mobile terminal implementing an embodiment of the present invention.

FIG. 2a is a front perspective view of the mobile terminal according to an exemplary embodiment of the present invention.

The mobile terminal includes a bar type terminal body 101. Without being limited thereto, the present invention can be also applicable to a slide type mobile terminal, a folder type mobile terminal, a swing type mobile terminal, a swivel type mobile terminal and the like, including two or more bodies.

The terminal body includes a case (or casing, housing, cover, etc.) constituting the external appearance of the terminal body. In the present exemplary embodiment, the case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, camera 121, and the user input unit 130 (131, 132), the microphone 122, the interface 170, and the like, may be located on the terminal body, namely, mainly, on the front case 101.

The display unit 151 occupies the most portion of the front surface of the front case 102. The audio output unit 151 and the camera 121 are disposed at a region adjacent to one of both end portions of the display unit 151, and the user input unit 130 and the microphone 122 are disposed at a region adjacent to another of the both end portions. The user input unit 132, the interface 170, and the like, may be disposed at the sides of the front case 101 and the rear case 102.

The user input unit 130 is manipulated to receive commands for controlling the operation of the mobile terminal 100, and may include a plurality of manipulation units 131 and 132. The manipulation units 131 and 132 may be generally called a manipulating portion, and they can employ any method so long as they can be manipulated in a tactile manner by the user.

Content inputted by the first and second manipulation units 131 and 132 may be variably set. For example, the first manipulation unit 131 receives commands such as start, end, scroll, or the like, and the second manipulation unit 132 may receive commands such as adjustment of size of a sound outputted from the audio output unit 152 or conversion to a touch recognition mode of the display unit 151.

Figure 2B:
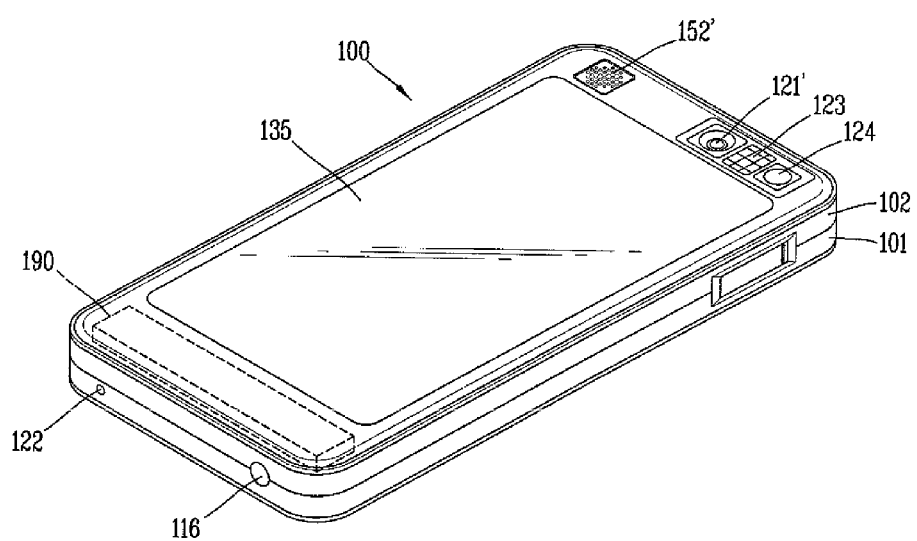
FIG. 2b is a rear perspective view of a mobile terminal implementing an embodiment of the present invention.

FIG. 2b is a rear perspective view of the mobile terminal illustrated in FIG. 2a according to an exemplary embodiment of the present invention.

With reference to FIG. 2b, a camera 121' may additionally be disposed on a rear surface of the terminal body, namely, on the rear case 102. The camera 121' may have an image capture direction which is substantially opposite to that of the camera 121 (See FIG. 2a), and may support a different number of pixels (i.e., have a different resolution) than the camera 121.

For example, camera 121 may operate with a relatively lower resolution to capture an image(s) of the user's face and immediately transmit such image(s) to another party in real-time during video call communication or the like. Meanwhile the camera 121' may operate with a relatively higher resolution to capture images of general objects with high picture quality, which may not require immediately transmission in real time. The cameras 121 and 121' may be installed on the terminal such that they are rotated or popped up.

A flash 123 and a mirror 124, may be additionally disposed adjacent to the camera 121'. When an image of the subject is captured with the camera 121', the flash 123 illuminates the subject. The mirror 124 allows the user to see himself when he wants to capture his own image (i.e., self-image capturing) by using the camera 121' of the second body 205.

An audio output unit 152' may be additionally disposed on the rear surface of the terminal body. The audio output unit 152' may implement a stereoscopic function along with the audio output unit 152 (See FIG. 2a), and may be used for implementing a speaker phone mode during call communication.

A broadcast signal receiving antenna 116 may be disposed at the side of the terminal body in addition to an antenna that supports mobile communications. The antenna 116 forming a portion of the broadcast reception module 111 (in FIG. 1) may be installed to be protracted.

A power supply unit 190 for supplying power to the mobile terminal 100 may be mounted on the terminal body 101. The power supply unit 190 may be installed in the terminal body or may be directly detached from the outside of the terminal body.

A touch pad for detecting a touch may be additionally mounted on the rear case 102. Such touch pad may be configured to be light-transmissive like the display unit 151. In this case, when the display unit 151 is configured to output visual information from both sides thereof, the visual information can be recognized through the touch pad 135. Information outputted to the both sides of the display unit 151 may be all controlled by the touch pad 135. Alternatively, a display may be additionally mounted on the touch pad 135, and a touch screen may be disposed on the rear case 102.

The touch pad 135 is operated in relation to the display unit 151 of the front case 101. The touch pad 135 may be disposed to be parallel to the rear side of the display unit 151. The touch pad 135 may have the same size or smaller than the display unit 151.

Figure 3:
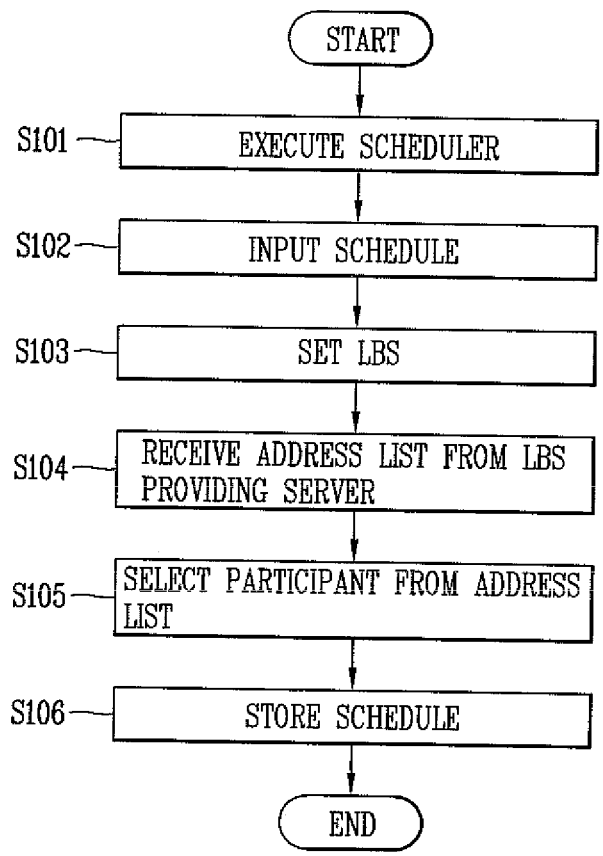
FIG. 3 is a flow chart illustrating the process of a schedule notifying method of a mobile terminal according to an exemplary embodiment of the present invention.

FIG. 3 is a flow chart illustrating the process of a schedule notifying method of a mobile terminal according to an exemplary embodiment of the present invention.

With reference to FIG. 3, when the user wants to register a schedule, the user selects a scheduler among menus by manipulating the user input unit 130. The controller 180 of the mobile terminal 100 executes the scheduler according to the user's menu manipulation (S101). And the controller 180 displays a scheduler executed screen image. The scheduler executed screen image refers to a screen image displaying a schedule registered in the form of a calendar view or a schedule list view.

After executing the scheduler, the controller 180 inputs a schedule according to a user input (S102). For example, when a schedule addition menu is selected from among sub-menus of the scheduler according to a menu manipulation by the user on the scheduler executed screen image, the controller 180 enters a schedule creation mode and displays a schedule creation screen image on the display unit 151. The controller 180 inserts user input (data) inputted from the user input unit 130 to each field of the schedule creation screen image.

In creating the schedule, when the use of a location-based service (LBS) among the schedule creation items is set, the controller 180 sets an LBS field value of the schedule creation screen image as an enable state (S103). For example, the controller 180 inputs the LBS field value as ON or OFF according to a user input to set whether to use LBS. In the present exemplary embodiment, whether to use LBS is set when the schedule is registered, but the present invention is not limited thereto and whether to use LBS may be set in an environment setting menu of the mobile terminal.

When the LBS is set to be used, the controller 180 requests an address list from the LBS providing server, and receives it (S104). Here, the controller 180 may receive the received address which has been provided by the LBS providing server, and stores it in the memory 160. And whenever the mobile terminal accesses the LBS providing server, the controller 180 checks whether or not information of registered friends has been changed, and updates changed data.

The controller 180 displays the received address which has been provided by the LBS providing server on a display screen. Namely, the controller 180 displays a friend list registered to the address list. One or more of the friends on the friend list displayed on the display screen are selected as participants. Here, when participant(s) is not selected from the address list provided from the LBS providing server, the controller 180 releases the use of the LBS.

When inputting data to each field on the schedule creation screen image is completed, the controller 180 stores the created schedule in the memory 160 (S106). In other words, the controller 180 registers the created schedule to the scheduler.

Figure 4A:
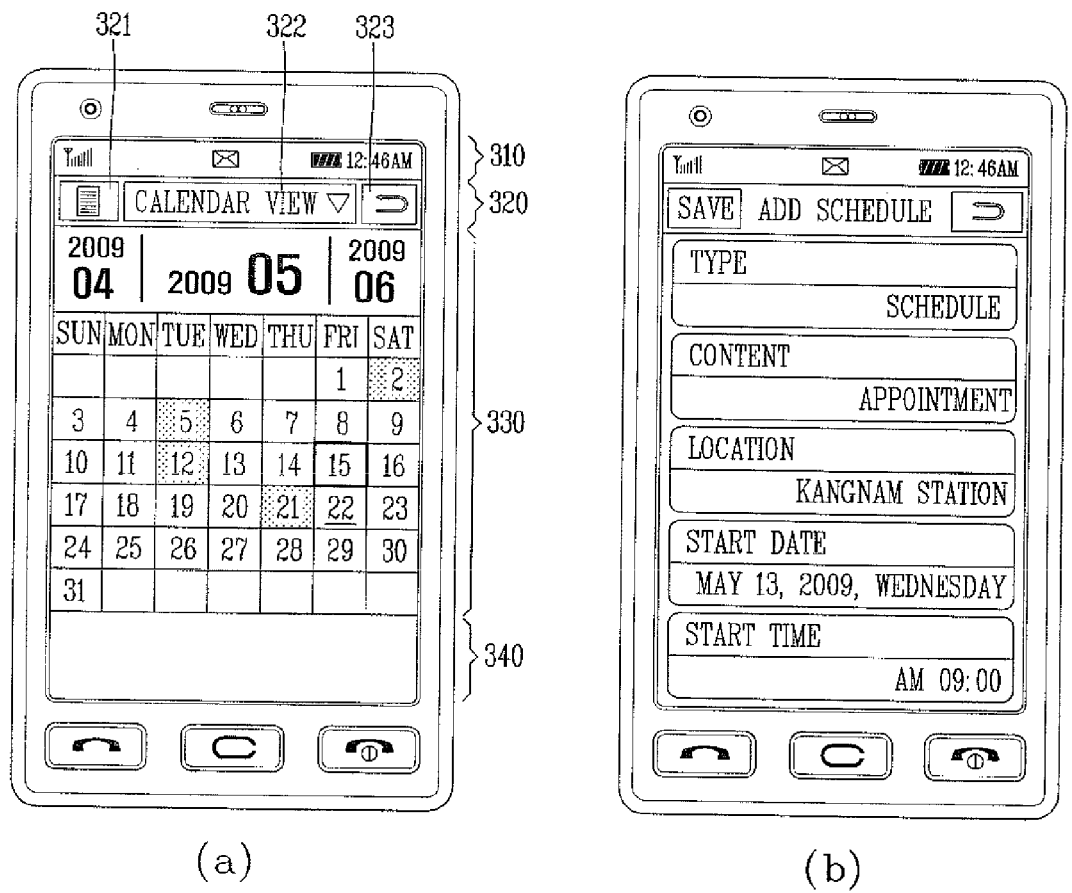
FIGS. 4a to 4c illustrate examples of adding a schedule in the mobile terminal according to an exemplary embodiment of the present invention.
Figure 4B:
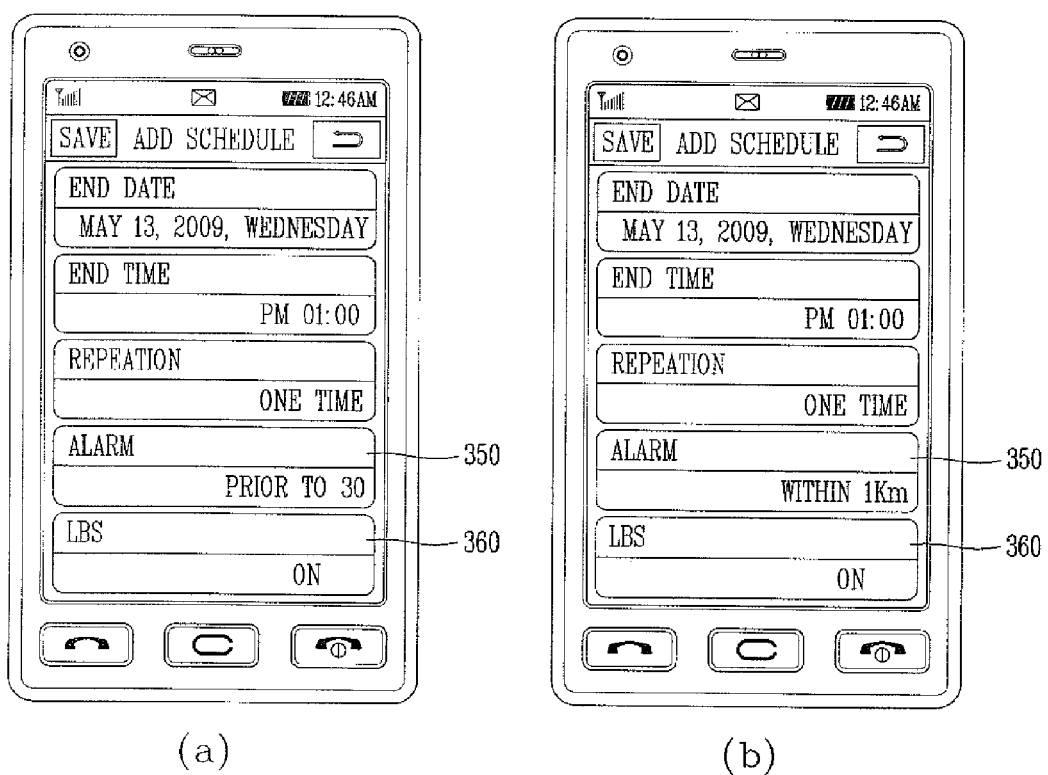
Figure 4C:
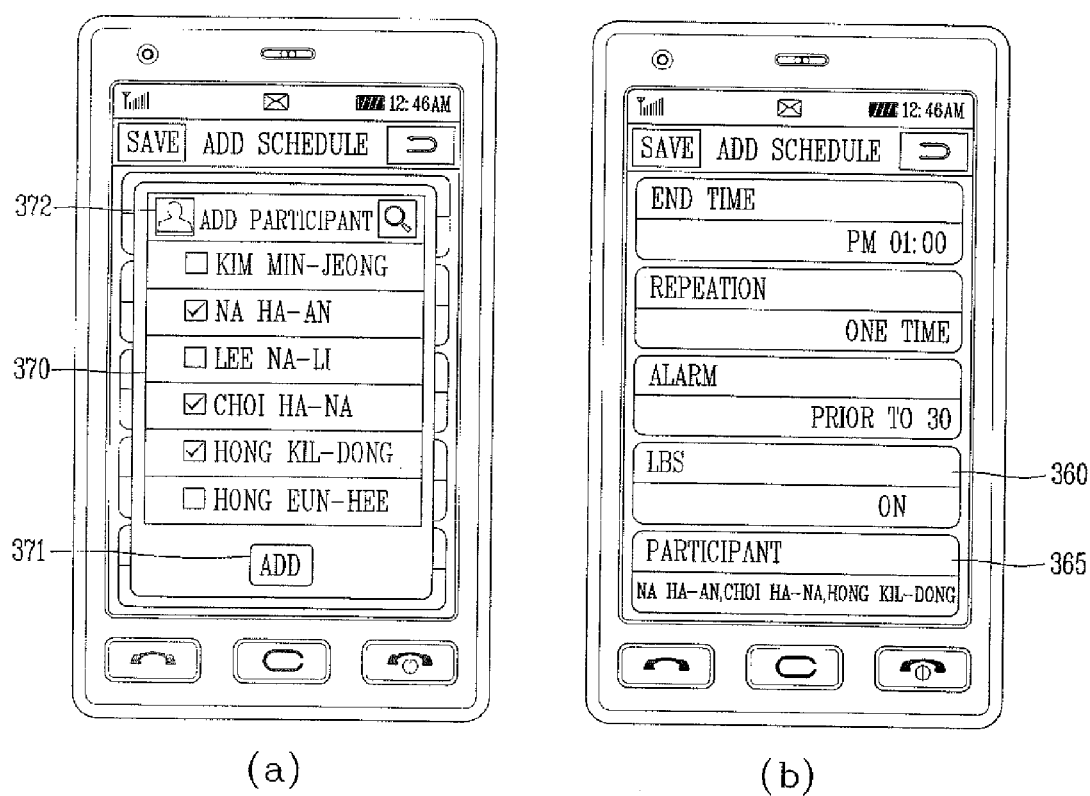

FIGS. 4a to 4c illustrate examples of adding a schedule in the mobile terminal according to an exemplary embodiment of the present invention.

With reference to FIG. 4a, the controller 180 executes the scheduler according to a menu manipulation by the user and displays the scheduler executed screen image on the display unit 151(a). The scheduler executed screen image includes a first region 310 displaying the state of the terminal, a second region 320 displaying a menu icon 321, a list box 322 for setting a view type, and a cancel icon 323, a third region 330 displaying a calendar, and a fourth region 340 displaying a schedule. Here, the view type may include a calendar view, a week view, a time view, a date view, a plan (things to be done) view, and the like. The third region 330 and the fourth region 340 may be combined into one region. Also, the controller 180 provides a visual effect to allow user to recognize a date registered for a schedule and/or plan. For example, the controller 180 may display an icon indicating that there is a schedule or plan at one side of the date for which a schedule and/or plan are registered, or displays an underline. Alternatively, the controller 180 may change the color of the date.

When the user selects a schedule addition menu by manipulating the menu icon 321 on the scheduler executed screen image, the controller 180 changes the screen image of mobile terminal into a schedule addition mode (b). In this case, the controller 180 displays the schedule addition screen image on the display screen. The schedule addition screen image includes fields for inputting information such as a type (schedule, plan, anniversary), content, location (an appointment place), a start date, a start time, an end date, an end time, repetition, notification, LBS setting, participant (friend, appointment counterpart), and the like.

When the user selects one of the fields, the controller 180 enters an input mode in which data can be inputted into the field. In the data input mode, the controller 180 inputs data inputted by the user into corresponding fields.

With reference to FIG. 4b, the mobile terminal 100 allow for setting of an alarm method. In the present exemplary embodiment, because the LBS is in use, an alarm time(notification time) or an alarm distance(notification distance) can be set. Here, the alarm time and alarm distance is a time point at which there is a schedule.

First, when the user selects a notification field 350, the controller 180 displays a type of the alarm method. Here, the alarm methods may include 'None, an alarm time, an alarm distance, and the like. When the alarm time is selected among the alarm methods, the controller 180 displays a time list that can be set such as 'prior to 10 minutes', 'prior to 20 minutes', 'prior to one day', a user definition, and the like. When one of the time on the arranged time list is selected, the controller 180 sets the alarm time with the selected value. For example, when the user sets a start time of a scheduler as 2:00 p.m. and the alarm time as 30 minutes, the controller 180 sets 1:30 p.m. as the schedule alarm time.

Meanwhile, when the alarm distance is selected as an alarm method, the controller 180 provides distances such as 'within 100 m', 'within 500 m', 'within 1 km', 'within 2 km', 'within 5 km', user definition, and the like. When one of the provided distances is selected, the controller 180 sets the selected distance as the alarm distance (b). For example, when the 'within 1 km' is selected from among the distances provided in the mobile terminal, the controller 180 sets the alarm distance with the selected distance. Namely, the mobile terminal 100 sets such that when the distance between the participant and the appointment place is within the set alarm distance, a schedule notification signal is outputted.

When the LBS setting field 360 is selected from the schedule creation screen image in FIG. 4b, the controller 180 sets/ releases the LBS according to a user input. When the LBS is set, the controller is connected to the particular LBS providing server. In this case, the controller 180 performs an authentication procedure by using user information (an ID, a password, an authentication key, etc.), which is previously stored or directly inputted by the user. When the mobile terminal 10 is connected to the LBS providing server, the controller 180 requests the LBS providing server to provide the friend list (address list) registered in the LBS providing server. Then, the LBS providing server transmits the friend list to the mobile terminal 100 according to the request from the controller 180. The controller 180 of the mobile terminal 100 displays the friend list provided from the LBS providing server in a pop-up window 370 of the display unit 151 as shown in FIG. 4c(a).

The user selects a friend desired to be registered as a participant from the displayed friend list. For example, when a touch applied to a particular item in the displayed friend list is detected, the controller 180 displays a selection mark 'V' in a check box of the corresponding item. Here, when the selected item is touched again, the controller 180 recognizes it as a deletion of the selected corresponding item and make the selection mark 'V' displayed in the check box disappear. After the selecting of the participant is completed, when an 'addition' button 371 is pressed, the controller 180 inputs the friend selected as a participant by the user to the participant field 365(b).

Meanwhile, if there is no friend to be set as a participant in the friend list, the user may register a new friend by selecting the addition icon 371.

Figure 5:
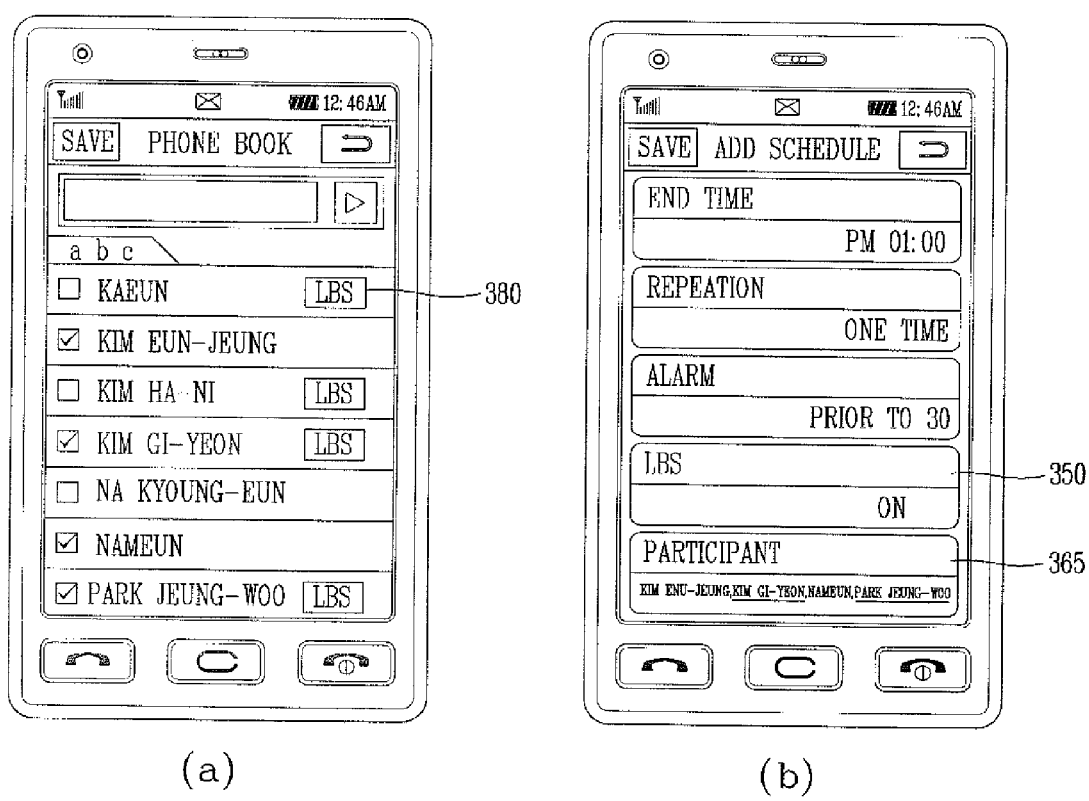
FIG. 5 illustrates an example of inputting a participant by using a phone book in the mobile terminal according to an exemplary embodiment of the present invention.

FIG. 5 illustrates an example of inputting a participant by using a phone book in the mobile terminal according to an exemplary embodiment of the present invention.

First, when an LBS is set in the schedule creation screen image and the participant field 365 is selected, the controller 180 executes the phone book (a). Or, when a contact icon 372 of the pop-up window 370 illustrated in FIG. 4c(a) is selected, the controller 180 executes the phone book. With the phone book executed, the controller 180 displays a contact person list registered to the phone book. In this case, the controller 180 indicates whether or not each contact person uses the LBS. In other words, the controller 180 displays whether or not each contact person is a user registered to the LBS providing server. For example, as shown in FIG. 5(a), when a contact person uses the LBS, the controller 180 displays an indication icon 411. Here, the controller 180 may display a logo of a social network site (SNS) to which contact person has been subscribed.

When one or more contact persons on the contact person list are selected, the controller 180 inputs the selected contact persons as the participants to the participant field 365(b). In this case, if the contact persons do not use, the controller 180 may transmit an invitation message recommending a subscription to the LBS to the corresponding contact persons.

Figure 6:
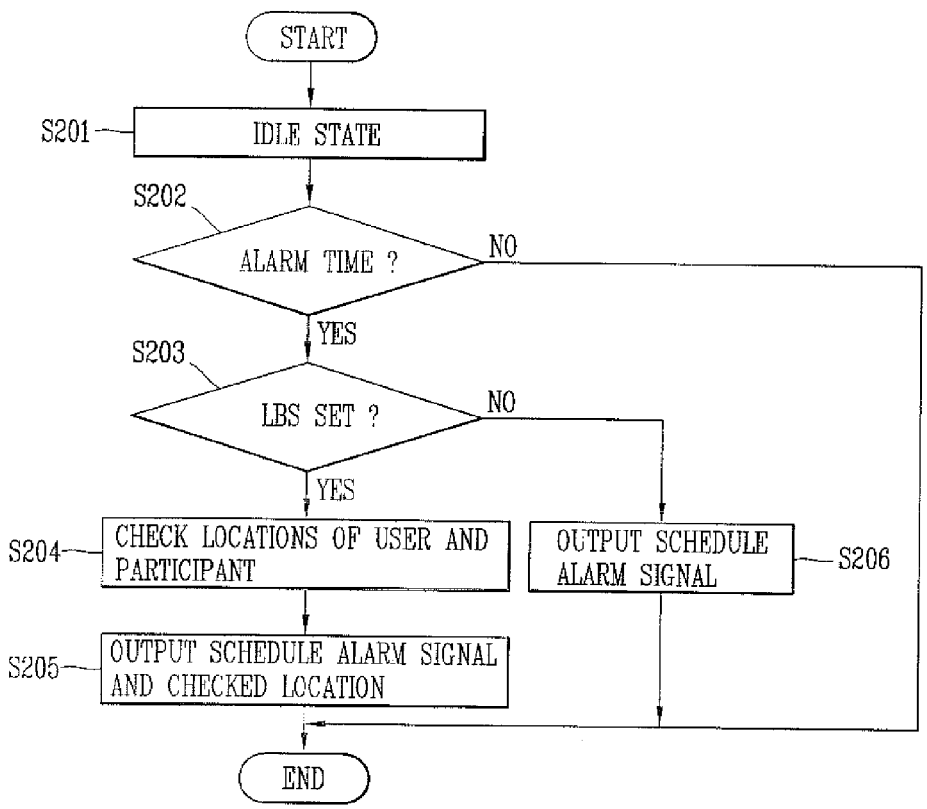
FIG. 6 is a flow chart illustrating a schedule notifying method of a mobile terminal according to an exemplary embodiment of the present invention.

FIG. 6 is a flow chart illustrating a schedule notifying method of a mobile terminal according to an exemplary embodiment of the present invention. In this exemplary embodiment, a case where a schedule is previously registered will be taken as an example.

With reference to FIG. 6, the mobile terminal 100 is in an idle state and has one or more schedules, for which a prior schedule notification has been set, stored in the memory 160 (S201). In other words, the user has registered one or more schedules in the scheduler. When the schedules are registered, the controller 180 may set an alarm to notify about a schedule when a particular time arrives according to a user input.

The controller 180 of the mobile terminal 100 checks whether or not the set schedule alarm time has arrived (S202). The alarm time may be set as a time or a distance. For example, when an appointment time is set to be 1:00 p.m. and the alarm time is set to be 30 minutes prior to the appointment time, the controller checks whether or not a current time is 12:30 p.m. Or, when an appointment place is 'Kangnam Station' and the alarm distance is set as 'within 2 kilometers', the controller 180 checks whether or not the participant is located within 2-kilometer radius from the appointment place 'Kangnam Station". Here, if there are two or more participants, when one or more participants come within 2-kilometer radius from the appointment place or when all of the participants come within 2-kilometer radius from the appointment place, the controller recognizes it as an alarm time.

Here, the controller 180 may periodically check the locations of the participants registered to the schedule. Or, when at least one participant among the participants registered to the schedule enters within a certain radius from the appointment place according to a request from the controller 180, the LBS server (location providing server) may notify the user terminal accordingly.

When the alarm time arrives, the controller 180 checks whether the LBS has been set (S203). Namely, the controller 180 checks whether or not the LBS is active or deactive for a corresponding schedule.

When the LBS has been set, the controller 180 checks the location of the participant registered to the schedule and the location of the user (S204). The controller 180 requests location information of the participant registered to the schedule from the LBS providing server. The LBS providing server checks the location of the participant. Here, if the participant is in a connected state, the LBS providing server acquires a current location of the participant. If the participant is not in a connected state, the LBS providing server acquires a location previously set by the participant or a location immediately before a final log-out (namely, the latest location). When the participant is not in a connected state with the LBS providing server, the LBS providing server may transmit a text message requesting connection thereto to the mobile terminal 100 of the participant.

Also, the controller 180 drives the location information module 115 to acquire location information of the user terminal. Namely, the mobile terminal acquires its location information through a GPS.

When the locations of the participant and the user are checked, the controller 180 outputs a schedule notification signal and the checked locations of the participant and the user (S205). For example, when the alarm time arrives, the controller 180 displays a corresponding schedule in a pop-up manner on the display unit 151. With the schedule displayed, when location confirmation is requested, the controller 180 displays the checked locations of the participant and the user on the map. Or, the controller 180 may display the locations of the participant and the user on the map and, at the same time, displays the schedule in a pop-up window. When displaying the schedule in the pop-up manner, the controller 180 may output a pre-set notification sound via the speaker.

If the LBS has not been set in step S203, the controller 180 outputs a schedule notification signal (S206). For example, the controller 180 outputs a schedule type and content, a start time, an appointment place, and the like, registered as the schedule as text on the display screen. Also, the controller 180 may output a notification sound and/or vibration together with the text.

Figure 7:
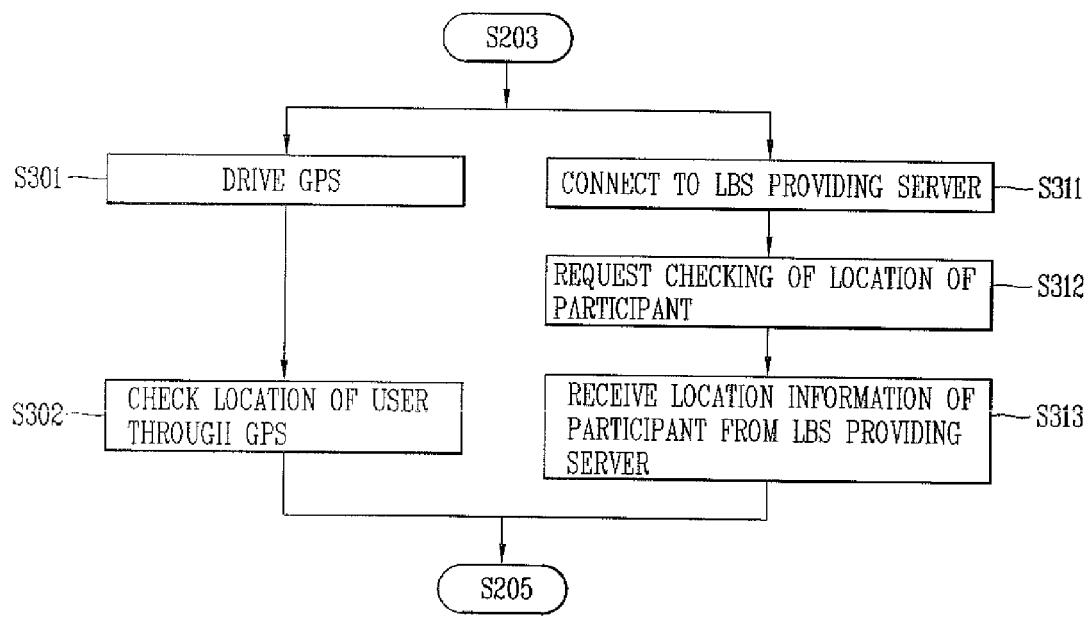
FIG. 7 is a flow chart illustrating the process of acquiring location information of mobile terminal and a participant according to an exemplary embodiment of the present invention.

FIG. 7 is a flow chart illustrating the process of acquiring location information of mobile terminal and a participant according to an exemplary embodiment of the present invention.

First, when an alarm time of a particular schedule previously registered in the schedule arrives, the controller 180 drives the location information module 115 (S301). For example, the controller 180 continuously checks whether or not the alarm time arrives by comparing the alarm time of the previously registered schedule and a current time. When the alarm time and the current time are consistent, the controller 180 drives the GPS module 115.

When the location information module 115 is driven, the controller 180 acquires current location information of the terminal via the location information module 115 (S302). For example, the controller 180 acquires the location information from a GPS satellite through the location information module 115.

Also, the controller 180 is connected to the pre-set LBS providing server (S311). In this case, the controller 180 is connected to the LBS providing server through an authentication procedure. For example, the controller drives the wireless Internet module 113 so as to be connected to an SNS (e.g., Gypsii) providing an BLS. When the controller 180 is connected to the LBS providing server, the controller 180 requests checking of the location of the participant included in the schedule (S312). Namely, the controller 180 generates a location check request message including information (ID, e-mail address, etc.) regarding the participant and transmits the same to the LBS providing server. The LBS providing server requests the location information from the terminal of the participant included in the request message, and acquires it. The LBS providing server requests providing of current location information from the terminal of the participant, and the terminal of the participant transmits its location information which has been acquired through the GPSa to the LBS providing server. In the present exemplary embodiment, the terminal of the participant checks its current location and provides it to the LBS providing server according to the request of the LBS providing server. However, the present invention is not limited thereto and the terminal itself subscribed to the LBS may acquire its location information and periodically transmit it to the LBS providing server.

The LBS providing server acquires also connection state information of the participant. The connection state information may include a log-in state, a log-out state, and the like.

When the location information of the participant is acquired, the LBS providing server transmits the acquired location information of the participant to the mobile terminal 100 (S313).

Figure 8:
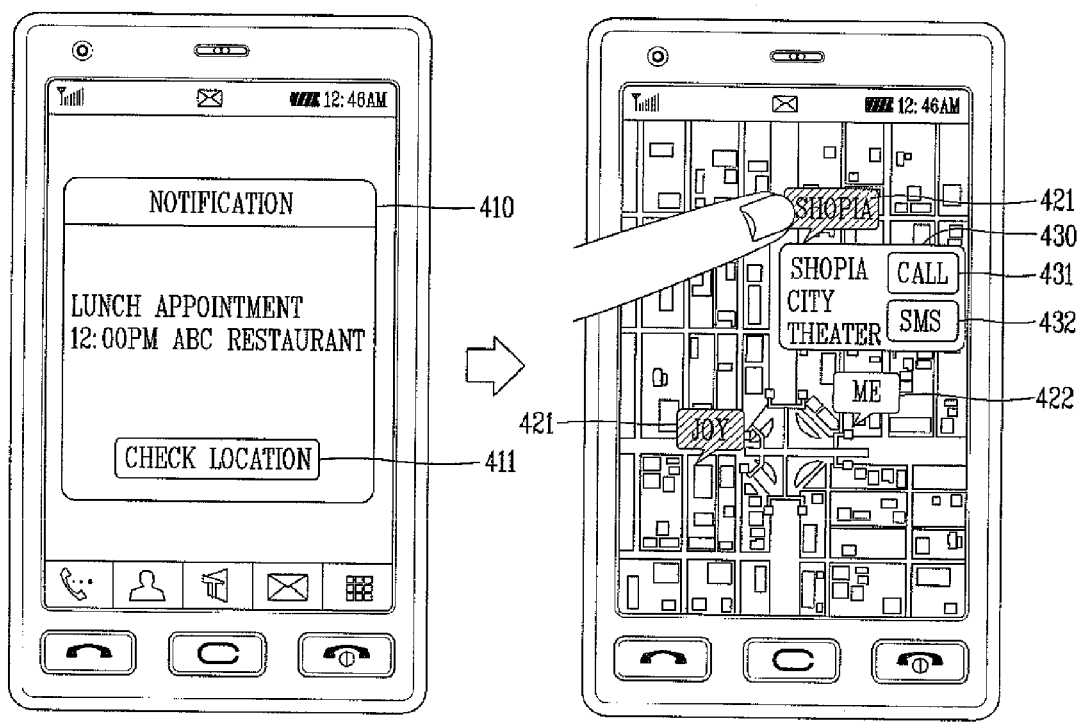
FIG. 8 is an overview of screen display illustrating one example of a schedule notification signal of the mobile terminal according to an exemplary embodiment of the present invention.

FIG. 8 is an overview of screen display illustrating one example of a schedule notification signal of the mobile terminal according to an exemplary embodiment of the present invention.

First, the user registers a schedule in advance by using the scheduler function. The controller 180 of the mobile terminal checks whether or not an alarm time set in the schedule has arrived. For example, when an appointment time of the previously registered schedule is 12:00 p.m., and it is set to notify about the schedule at one hour prior to the appointment time, the controller 180 checks whether or not a current time is consistent with 11:00 a.m.

When the alarm time arrives, the controller 180 displays a notification message on a pop-up window 410(*a*). When displaying the notification message, the controller 180 controls the alarm unit 153 to output a notification sound. The notification message may include information regarding a title, a start time, a place, and the like set when the schedule was registered. Also, the pop-up window 410 includes an icon 411 for requesting checking of the location of the participant.

When the current location of the participant set in the schedule is desired to be checked, the user touches the location check icon 411 displayed on the pop-up window 410. The controller 180 recognizes the touch input as a location check request and requests location checking of the participants set in the schedule from the LBS providing server. In this case, the controller 180 acquires its current location information via the location information module 115. The LBS providing server checks the locations of the participants according to the request from the mobile terminal 100. Here, the LBS providing server also checks a connection state of the participants. The connection state includes a log-in state, a state in which the participants are connected to the LBS providing server and a log-out state in which the participants are not connected to the LBS providing server.

The controller 180 of the mobile terminal 100 receives location information of the participant(s) from the LBS providing server via the wireless communication unit 110. The controller 180 displays the location of the participant on the map by using the received location information of the participant (b). In this case, the controller 180 searches a point corresponding to the location information of the participant from the map and indicates a particular indicator 421 such as a pin. In displaying the location of the participant, the controller 180 displays a connected state with the indicators 421 and 422 in different colors. For example, when the participant is in a log-in state with respect to the LBS providing server, the controller 180 displays the indicators 421 and 422 in green color, and when the participant is in a log-out state with respect to the LBS providing server, the controller displays the indicators 421 and 422 in red color.

The controller 180 may display its location together as well as the location of the participant. The controller 180 displays the indicator 421 indicating the location of the participant and the indicator 422 indicating its location in different colors to allow for discrimination of them. A name may be displayed on the indicator to discriminate the user and the participant, thus providing a visual effect.

When one of the participants displayed on the map is selected, the controller 180 displays location information of the corresponding participant at one side of the indicator 421 on a pop-up window 430. For example, when a proximity touch to the indicator 421 indicating one of the participants is detected, the controller 180 displays location information (the name of a place, the name of a building, the name of a road, and the like) of the corresponding participant as text on the pop-up window. In this case, the pop-up window 430 displaying the location information of the participant includes call and message icons 431 and 432. When the call icon 431 is selected, the controller 180 requests a call connection with the terminal of the corresponding participant. Meanwhile, when the message icon 432 is selected, the controller 180 changes a current screen image to a message creation screen image. The controller 180 inputs a phone number of the corresponding participant to a recipient field of the message creation screen image. In other words, the controller 180 executes a message function and enters a message creation mode. Thereafter, when creating of a message is completed, the controller 180 transmits the created message to the participant inputted in the recipient field according to a user instruction.

The map information may be read from the memory 160 or may be received from the LBS providing server.

Figure 9:
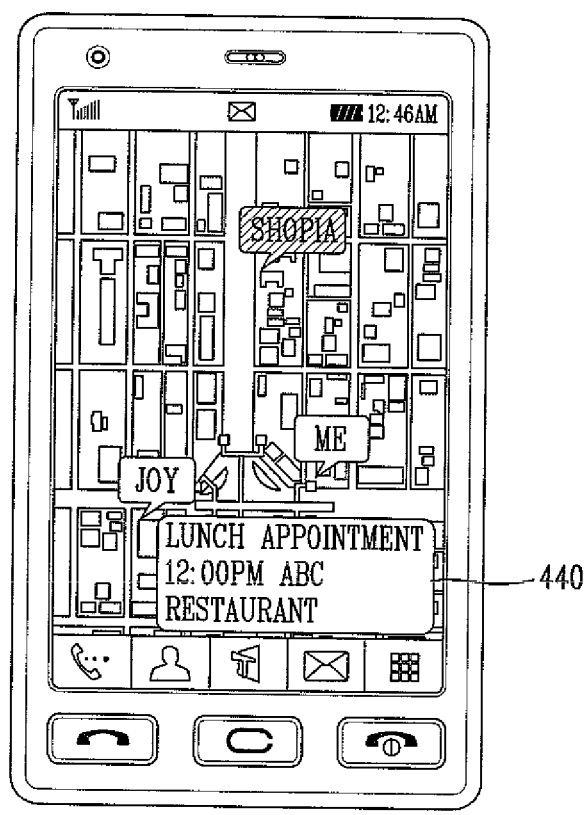
FIG. 9 is an overview of screen display illustrating another example of a schedule notification signal of the mobile terminal according to an exemplary embodiment of the present invention.

FIG. 9 is an overview of screen display illustrating another example of a schedule notification signal of the mobile terminal according to an exemplary embodiment of the present invention.

The controller 180 of the mobile terminal 100 registers the notification-set schedule according to the procedure illustrated in FIG. 3. Namely, the controller 180 stores a schedule inputted by the user in the memory 160. Thereafter, the controller 180 checks whether the alarm time of the registered schedule has arrived.

When the alarm time arrives, the controller 180 requests location information of the participant from the LBS providing server. For example, the controller 180 transmits a location check request message including information regarding the participant to the LBS providing server. The LBS providing server acquires location information of the participant according to the quest from the mobile terminal 100 and transmits the same to the mobile terminal 100.

Upon receiving the location information of the participant from the LBS providing server, the mobile terminal 100 displays the location of the participant on the map as shown in FIG. 9, and displays the schedule on the pop-up window 440. After checking the schedule displayed on the pop-up window 440, when the pop-up window 440 is touched, the controller 180 does not display the pop-up window 440 on the display screen. Namely, the pop-up window 440 disappears from the display screen.

Figure 10:
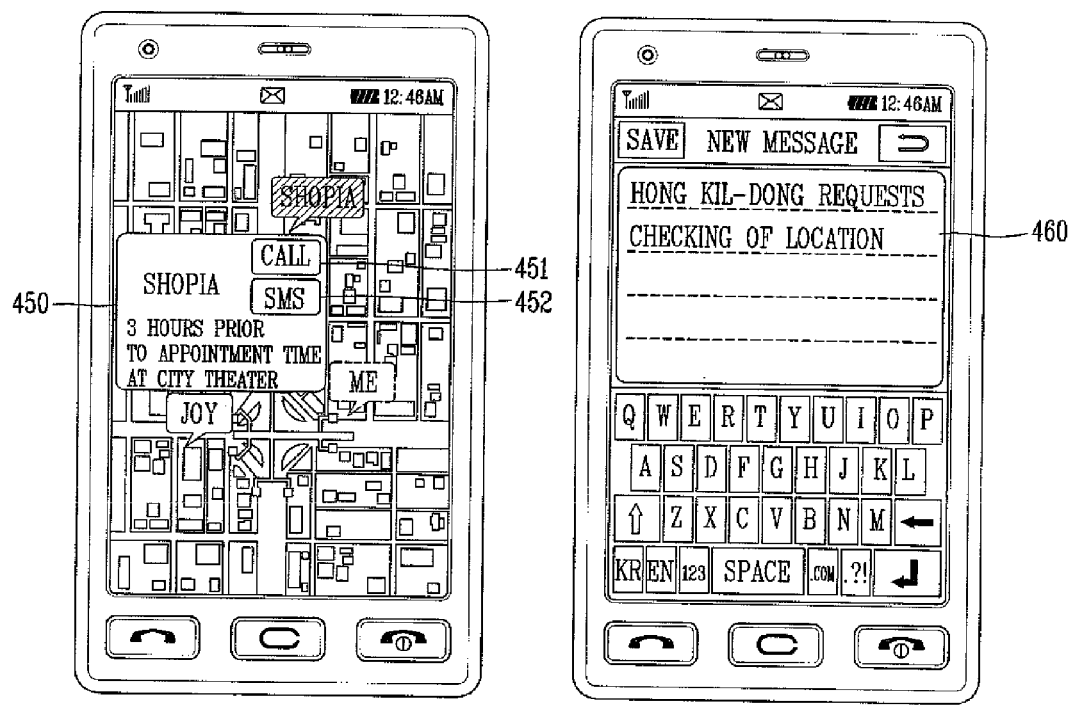
FIG. 10 is an overview of screen display illustrating transmission of a connection request message to a participant in a log-out state in a mobile terminal according to an exemplary embodiment of the present invention.

FIG. 10 is an overview of screen display illustrating transmission of a connection request message to a participant in a log-out state in a mobile terminal according to an exemplary embodiment of the present invention.

First, when the alarm time of the previously registered schedule arrives, the controller 180 acquires the location information of the participants registered in the schedule and displays as shown in FIG. 10(*a*). When the indicator 441 of a participant in a log-out state among the displayed participants is promixity-touched, the controller 180 displays location information immediately before the recent log-out of the participant on the pop-up window 450. When a message icon 452 displayed on the pop-up window 450 is selected, the controller 180 changes the current screen image to the message creation screen image (b). In this case, the controller 180 may input a pre-set message as a default to the message input column 460 of the message creation screen image.

When the terminal of the participant receives the message, it displays the message on the display screen. The participant checks the message and accesses the LBS providing server in order to transmit his location information to the LBS providing server, or may not attempt a connection.

Figure 11:
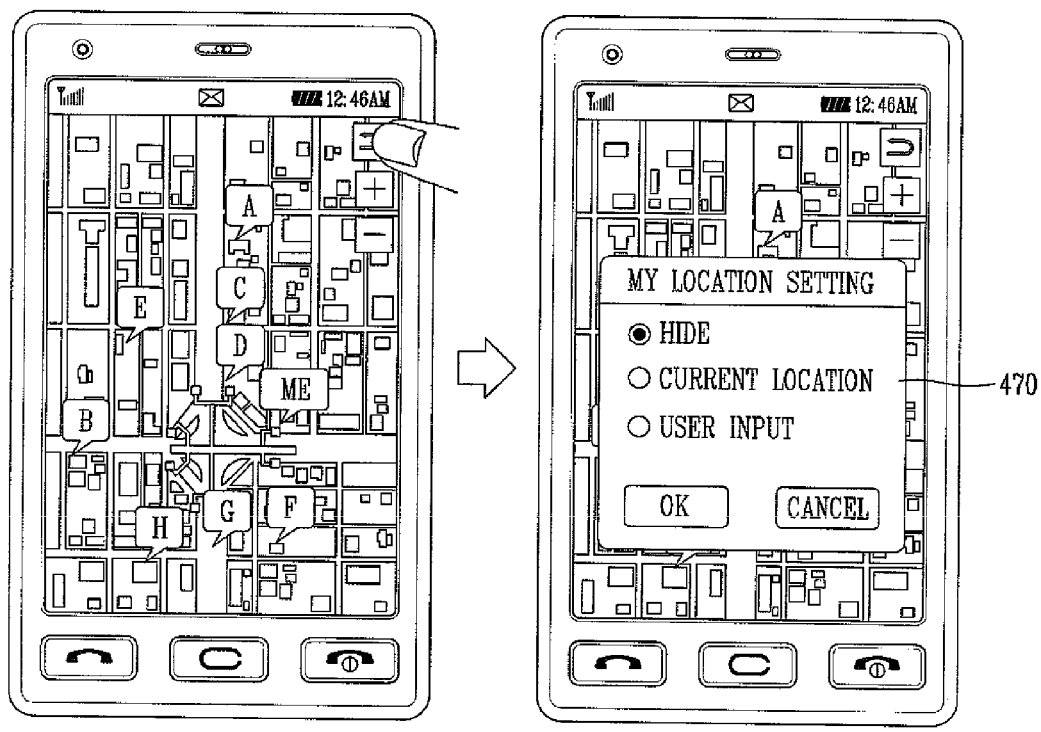
FIG. 11 is an overview of screen display illustrating setting of a location of a mobile terminal according to an exemplary embodiment of the present invention.

FIG. 11 is an overview of screen display illustrating setting of a location of a mobile terminal according to an exemplary embodiment of the present invention.

First, the controller 180 acquires the location information of the participant and the mobile terminal and displays the acquired location information on the map (a). When an end button is inputted while the location information is being displayed, the controller 180 displays my location setting pop-up window 470 on the display unit 151. When a particular one of the my location setting pop-up window 470 is selected, the controller 180 displays my position in the event of an SNS site log-out as the selected location.

Here, when a my location concealment is set, the controller 180 does not provide location information of the terminal when the SNS site is logged out. Also, even if the SNS site receives providing location information of the terminal from a different terminal, it does not provide location information of the terminal to the different terminal.

When my position is set as a current location, the controller 180 acquires location information immediately before log-out and transmits it to the server of the SNS site.

When the user directly inputs my location, the controller 180 sets the inputted location as my location. For example, when the user inputs 'Seoul station' as my location before the SNS log-out, the controller 180 stores the inputted location information as my location information in a database of the SNS site. Thereafter, when checking of the location of the terminal is requested, the server transmits the stored location information to the requesting terminal.

In the above-described exemplary embodiments, the terminal is connected to the LBS providing server and transmits its location information to the LBS providing server while using a service provided by the LBS providing server, but the present invention is not thereto and the terminal may transmit its location information to the LBS providing server while maintaining a connection with the LBS providing server as a background. IN this case, the terminal may transmit its location information at certain time intervals or when the location is changed, the terminal may transmit corresponding location information to the LBS providing server.

Also, in the above-described exemplary embodiments, the terminal acquires its location information by using the GPS. However, in a space such as a building where it is difficult to check an accurate location only through GPS, more accurate location can be provided by using WiFi, an access point (AP), and the like.

As described above, with the mobile terminal according to the exemplary embodiments of the present invention, when the mobile terminal informs about a schedule by interworking with the schedule based on a location-based service, it acquires its location and location information of the other party (participant) and displays the same. Thus, the user can check the location of the other party while checking his schedule.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of controlling a mobile terminal, the method comprising: entering a schedule creation mode for creating an alarm reminder; displaying, via a display of the mobile terminal, an add option for adding a location based alarm based on the entered schedule creation mode and a list of contacts included in a contact list associated with the mobile terminal; receiving a selection signal indicting a selection of one of the displayed list of contacts; inputting, based on the add option being selected, the selected contact as a participant, a reminder name for the created alarm reminder and a physical location that the location based alarm is to be output when at least one of the participant and the mobile terminal is within a near predetermined distance from the physical location; when the selected contact is not registered to a Location Based Service (LBS), transmitting an invitation message recommending a subscription to the LBS to the participant; when the reminder creation is completed, registering the created reminder in a memory associated with the mobile terminal; and outputting, via the display, the location based alarm when at least one of the participant and the mobile terminal is within the predetermined distance of the physical location.

2. The method of claim 1, further comprising:
inputting a date and time the location based alarm is to be output.

3. The method of claim 2, further comprising:
receiving a selection signal indicating a selection of one of a plurality of dates and times; and
assigning the selected date and time as the date and time the location based alarm is to be output.

4. The method of claim 1, further comprising:
acquiring, via a controller of the mobile terminal, location information of the mobile terminal.

5. The method of claim 1, further comprising:
displaying an indicator area on an upper portion of the display, said indicator area including icons indicating status information of the mobile terminal; and
displaying a calendar view icon below the indicator area for toggling between a daily schedule view and a monthly schedule view.

6. The method of claim 5, further comprising:
displaying information about the location based alarm for a particular day displayed in the calendar view when the particular day is selected.

7. The method of claim 5, further comprising:
displaying a monthly calendar on the display when the calendar view icon is set to the monthly schedule view.

8. The method of claim 7, further comprising:
displaying a visual indication allowing a user of the mobile terminal to recognize a date registered for the alarm reminder in the displayed monthly calendar.

9. The method of claim 1, further comprising:
receiving a setting signal indicating a setting of a distance the mobile terminal is to be located from the physical location when the location based alarm is to be output.

10. A mobile terminal, comprising: a wireless communication unit configured to wirelessly communicate with at least one other terminal; a display configured to display a schedule creation mode icon for creating an alarm reminder, and-to display an add option for adding a location based alarm based on the entered schedule creation mode, and to display a list of contacts included in a contact list associated with the mobile terminal; and a controller configured to receive a selection signal indicating a selection of one of the displayed list of contacts and an input, based on the add option being selected, of the selected contact as a participant, a reminder name for the created alarm reminder and a physical location that the location based alarm is to be output when at least one of the participant and the mobile terminal is within a near predetermined distance from the physical location, to transmit an invitation message recommending a subscription to a Location Based Service (LBS) to the participant when the selected contact is not registered to the LBS, to register the created reminder in a memory associated with the mobile terminal when the reminder creation is completed, and to control the display to output the location based alarm when at least one of the participant and the mobile terminal is within the predetermined distance of the physical location.

11. The mobile terminal of claim 10, wherein the controller is further configured to receive an input of a date and time the location based alarm is to be output.

12. The mobile terminal of claim 10, wherein the controller is further configured to acquire location information of the mobile terminal.

13. The mobile terminal of claim 10, wherein the controller is further configured to control the display to display an indicator area on an upper portion of the display, said indicator area including icons indicating status information of the mobile terminal, and to display a calendar view icon below the indicator area for toggling between a daily schedule view and a monthly schedule view.

14. The mobile terminal of claim 13, wherein the controller is further configured to control the display to display information about the location based alarm for a particular day displayed in the calendar view when the particular day is selected.

15. The mobile terminal of claim 13, wherein the controller is further configured to control the display to a monthly calendar on the display when the calendar view icon is set to the monthly schedule view.

16. The mobile terminal of claim 15, wherein the controller is further configured to control the display to a visual indication allowing a user of the mobile terminal to recognize a date registered for the alarm reminder in the displayed monthly calendar.

17. The mobile terminal of claim 11, wherein the controller is further configured to receive a selection signal indicating a selection of one of a plurality of dates and times, and to assign the selected date and time as the date and time the location based alarm is to be output.

18. The mobile terminal of claim 10, wherein the controller is further configured to receive a setting signal indicating a setting of a distance the mobile terminal is to be located from the physical location when the location based alarm is to be output.

* * * * *